US006151357A

United States Patent [19]
Jawahar et al.

[11] Patent Number: 6,151,357
[45] Date of Patent: Nov. 21, 2000

[54] METHOD AND APPARATUS FOR DISPLAYING A VISUAL INDICATION OF A TRANSMISSION STATUS

[75] Inventors: Janardhanan Jawahar, San Jose; Venkatachari Dilip, Cupertino; Murali Vaidyanthan, Fremont, all of Calif.

[73] Assignee: Aspect Communications Corporation, San Jose, Calif.

[21] Appl. No.: 09/008,956

[22] Filed: Jan. 16, 1998

[51] Int. Cl.$^7$ .............................. H04B 3/46; H04B 17/00; H04Q 1/20
[52] U.S. Cl. .......................................................... 375/228
[58] Field of Search .................................. 375/228, 222, 375/211, 213, 217; 358/405; 370/428, 394; 714/748, 749

[56] References Cited

U.S. PATENT DOCUMENTS

| | | | |
|---|---|---|---|
| 1,678,973 | 7/1928 | Brown | 375/228 |
| 4,064,459 | 12/1977 | Markwitz et al. | 375/228 |
| 4,398,297 | 8/1983 | Hwang et al. | 375/222 |
| 4,398,299 | 8/1983 | Darling et al. | 379/28 |
| 4,728,925 | 3/1988 | Randle et al. | 340/146.2 |
| 4,766,536 | 8/1988 | Wilson, Jr. et al. | 710/121 |
| 4,885,779 | 12/1989 | Atalla et al. | 380/56 |
| 4,920,533 | 4/1990 | Dufresne et al. | 370/445 |
| 5,255,086 | 10/1993 | McMullan, Jr. et al. | 348/12 |
| 5,291,489 | 3/1994 | Morgan et al. | 370/401 |
| 5,305,405 | 4/1994 | Emmons et al. | 385/73 |
| 5,343,509 | 8/1994 | Dounies | 379/40 |
| 5,727,002 | 3/1998 | Miller et al. | 714/748 |
| 5,745,836 | 4/1998 | Williams | 455/5.1 |
| 5,764,371 | 6/1998 | Kawashima et al. | 358/405 |
| 5,793,499 | 8/1998 | Hollis et al. | 358/439 |
| 5,887,050 | 3/1999 | Fenske et al. | 379/4 |
| 5,894,595 | 4/1999 | Foladare et al. | 455/414 |
| 5,936,743 | 8/1999 | Satoh | 358/434 |
| 5,956,154 | 9/1999 | Cairo | 358/434 |

*Primary Examiner*—Stephen Chin
*Assistant Examiner*—Lenny Jiang
*Attorney, Agent, or Firm*—Blakely, Sokoloff, Taylor & Zafman

[57] ABSTRACT

A system is provided for indicating a status of a transmission across a communication link. The system determines the status of the transmission across the communication link based on information received from a transmission destination. A first visual indicator representing the transmission status is displayed if the transmission is incomplete. A second visual indicator representing the transmission status is displayed if the transmission is complete. If the transmission status is incomplete, the system continues to determine the status of the transmission until the transmission is complete. A third visual indicator representing the transmission status is displayed if the communication link is congested. The visual indicators may be displayed proximate a transmission source or displayed to a transmission initiator. The system transmits instructions to the transmission destination, which cause the transmission destination to generate the transmission status. The instructions also cause the transmission destination to provide the generated transmission status to a transmission source.

30 Claims, 10 Drawing Sheets

SYSTEM INFORMATION

AGENT LOGIN NAME: JOHN DOE
AGENT GROUP: COMPUTER SALES
LOGIN TIME: 9:00 A.M.
AGENT STATUS: ACTIVE
SYSTEM UTILIZATION: MODERATE
SYSTEM PERFORMANCE: ABOVE AVERAGE

AGENT SCRIPT INFORMATION

THE ACME XL-3000 MULTI-MEDIA COMPUTER SYSTEM INCLUDES A HIGH RESOLUTION COLOR MONITOR, A HIGH SPEED COLOR PRINTER AND BUNDLED SOFTWARE, INCLUDING BOTH FINANCIAL SOFTWARE AND THE LATEST GAMES.

LINKS

FAQ - ACME XL-3000
FAQ - ACME XL-2500
OPTIONAL ACCESSORIES
UPGRADE INFORMATION
SOFTWARE INCLUDED IN BUNDLE

ACME XL-3000
MULTI-MEDIA COMPUTER SYSTEM

INCLUDES:   COLOR MONITOR
            COLOR PRINTER
            STEREO SPEAKERS
            SOFTWARE

TEXT CHAT WINDOW

AGENT: HOW WILL YOU USE YOUR NEW COMPUTER?
CUSTOMER: I WANT TO KEEP TRACK OF MY FINANCIAL ACCOUNTS, MONITOR MY INVESTMENTS, AND PLAY THE LATEST GAMES.
AGENT: YOU MIGHT BE INTERESTED IN OUR NEW XL-3000 SYSTEM, IT'S A POWERFUL MULTI-MEDIA SYSTEM.
CUSTOMER: TELL ME MORE.

FIG. 6

METHOD AND APPARATUS FOR DISPLAYING A VISUAL INDICATION OF A TRANSMISSION STATUS

FIELD OF THE INVENTION

The present invention relates to communication systems. More specifically, the invention provides a system that displays a visual indicator of the status of a transmission across a communication link.

BACKGROUND

Various types of systems are available for transmitting data from a transmission source to a transmission destination across a communication link. The time required to transmit data from a source to a destination depends on several factors including the amount of data to be transmitted, the speed or bandwidth of the communication link, and the speed at which data can be prepared for transmission by the transmission source. The speed at which data can be transmitted across the communication link may vary depending on other data transmissions using common paths or devices along the communication link. Thus, the time required to complete a particular data transmission is difficult to estimate if the data transmission speed across the communication link cannot be accurately determined.

In situations where the destination is distant from the source, it is difficult for an individual at the transmission source to determine when the data transmission is complete unless they are informed of the completed transmission by another individual at the data destination. For example, if an individual is transmitting an Internet web page to another individual for viewing, the transmission time can vary significantly depending on the congestion of the various communication paths and communication devices along the communication link from the source to the destination. Additionally, the transmission time will vary based on the size of the web page being transmitted. In this example, the transmission initiator (i.e., the individual transmitting the web page) cannot determine the status of the transmission unless a person at the destination contacts the transmission initiator (e.g., by placing a telephone call to the transmission initiator). Without communicating with a person at the transmission destination, the transmission initiator is unable to determine when a particular transmission has been completed and is unable to determine whether the transmission has been delayed due to congestion along the communication link.

It is therefore desirable to provide a system that provides an indicator of the status of a transmission across a communication link.

SUMMARY OF THE INVETION

The present invention is related to a system capable of displaying a visual indicator that represents the status of a transmission across a communication link. Embodiments of the invention provide a system that displays different visual indicators based on whether the transmission is complete, incomplete, or the communication link is congested. By using this visual indicator, an individual or system is able to determine when a particular transmission has been completed.

An embodiment of the invention indicates a transmission status by determining a status of a transmission across a communication link based on information received from a transmission destination. A first visual indicator representing the transmission status is displayed if the transmission is incomplete. A second visual indicator representing the transmission status is displayed if the transmission is complete.

Embodiments of the invention display a third visual indicator representing the transmission status if the communication link is congested.

An embodiment of the invention displays the visual indicators proximate a transmission source.

Other embodiments of the invention display the visual indicators to a transmission initiator.

A particular embodiment of the invention determines the status of the transmission across the communication link by transmitting instructions to the transmission destination. The instructions cause the transmission destination to generate the transmission status and provide the generated transmission status to a transmission source.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 6 illustrates an embodiment of various windows displayed to an agent using the agent's computer.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

The present invention is related to a system capable of displaying a visual indicator that represents the status of a transmission across a communication link. Embodiments of the invention provide a system that displays different visual indicators based on whether the transmission is complete, incomplete, or the communication link is congested. Additional visual indicators may be provided to indicate other transmission states, such as an aborted transmission. The appropriate visual indicator is displayed proximate the transmission source or displayed to the initiator of the transmission. By using this visual indicator, a transaction initiator is able to determine when a particular transmission has been completed. The teachings of the present invention can be used with any type of data transmission across any communication link. A particular communication link may include multiple paths or links across multiple networks through multiple devices (e.g., network switches or network routers).

Particular embodiments of the invention are described below as used in a transaction processing environment. However, the teachings of the present invention may be used in any data communication environment and with any type of data communication system. Embodiments of the invention described below communicate information (such as web page information) across a network. In alternate embodiments, the teachings of the present invention are applied to the communication of any type of information across any type of communication link.

Exemplary transactions in a transaction processing environment include telephone calls, facsimile transmissions, electronic mail (e-mail), video sessions, or network sessions (such as an Internet session). A particular transaction can be either inbound (e.g., received by a transaction processing system) or outbound (e.g., transmitted from a transaction processing system).

A transaction processing system is any device capable of receiving, transmitting, queuing, routing, or otherwise processing a transaction. A transaction processing system may also handle mixed transactions (e.g., receive a telephone call and respond to the telephone call using e-mail). Example transaction processing systems include automatic call distributors (ACDs), call centers, and other telephone call processing devices. The teachings of the present invention may be used with any type of transaction processing system.

Figure 1:
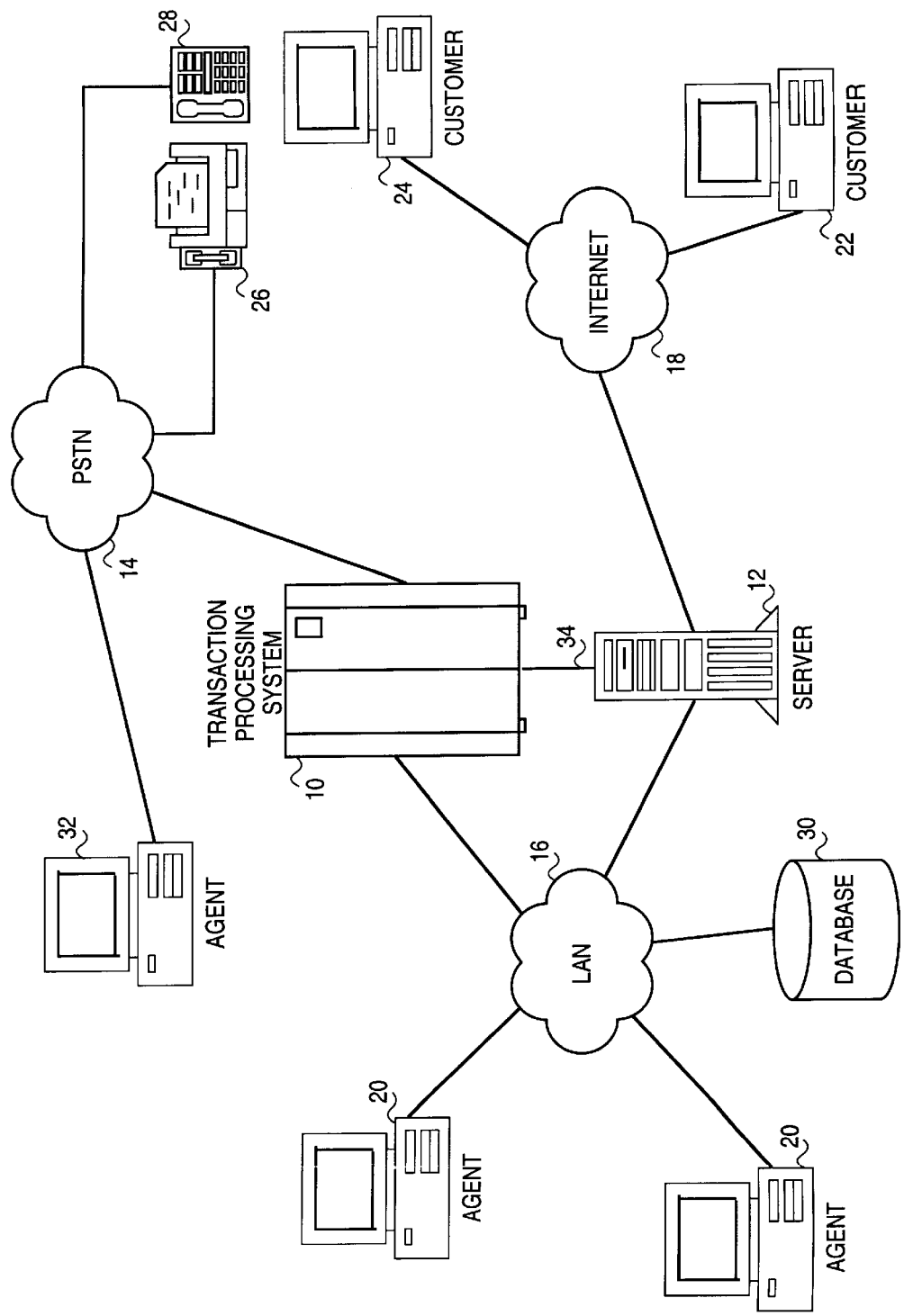
FIG. 1 illustrates an embodiment of a transaction processing environment in which the present invention may be used.

FIG. 1 illustrates an embodiment of a transaction processing environment in which the present invention may be used. The transaction processing environment of FIG. 1 allows transaction initiators (e.g., customers) to contact an agent (e.g., a customer service agent) using various types of transactions. Similarly, the transaction processing environment allows an agent to respond to a received transaction (e.g., received from a customer) or initiate a new transaction.

A transaction processing system 10 is coupled to a server 12, a public switched telephone network (PSTN) 14 and a local area network (LAN) 16. Transaction processing system 10 is capable of processing various types of transactions, such as telephone calls, electronic mail (e-mail), voice mail, and facsimiles. Transaction processing system 10 is capable of receiving transactions from PSTN 14, LAN 16, and server 12. Similarly, transaction processing system 10 is capable of transmitting transactions to PSTN 14, LAN16, and server 12. For example, transaction processing system 10 can receive an incoming telephone call directly via PSTN 14. Another incoming telephone call may be received by server 12 (e.g., an Internet telephone call received across Internet 18) and provided to transaction processing system 10 across a communication link 34 or across LAN 16. In other situations, transaction processing system 10 may receive an incoming e-mail from server 12 or LAN 16

FIG. 1 illustrates a single server 12 capable of interacting with various components in the transaction processing environment. For example, server 12 may operate as a web server, an e-mail server, a fax server, and a video server. Additionally, server 12 can perform the functions of a control server, as discussed below. In alternate embodiments of the invention, the transaction processing environment may include multiple servers, in which each server is responsible for one or more types of transactions. For example, a web server processes all web-based transactions, an e-mail/fax server processes all e-mail and facsimile transactions, and a control server controls and manages various transactions and communication sessions in the transaction processing environment.

LAN 16 can be any type of network, including an intranet network, capable of communicating information between various nodes in the network. Further, LAN 16 may use any network topology and communicate data using any communication protocol. As shown in FIG. 1, multiple agents 20 are coupled to LAN 16. In a typical transaction processing environment, hundreds or thousands of agents may be coupled to one or more LANs 16, which are coupled to transaction processing system 10. Alternatively, some or all of the agents 20 may be coupled directly to transaction processing system 10, rather than coupled through LAN 16. Although agents 20 are represented in FIG. 1 by a computer, a particular agent 20 may utilize any type of device or system that allows interaction between the agent and another person or device (such as a customer or a customer's computer). For example, an agent handling only telephone call transactions may only use a telephone system, without requiring a computer. Similarly, an agent handling only e-mail messages may require a computer system, but not a telephone. In a particular embodiment of the invention, each agent has a computer system and a telephone (which may be integrated into the computer system), such that the agent is capable of handling and responding to multiple types of transactions (e.g., telephone calls, e-mail, voice mail, and facsimiles).

An agent 32 is not coupled to LAN 16, but instead is coupled to PSTN 14. Agents 20, discussed above, are located locally to transaction processing system 10 or include an access mechanism allowing agents 20 to establish a connection to LAN 16. Agent 32 is a remote agent or otherwise unable to directly connect to LAN 16. For example, agent 32 may be working at a location geographically distant from transaction processing system 10, such as working at home or traveling. Agent 32 establishes a connection with transaction processing system 10 across PSTN 14. Alternatively, agent 32 may connect with LAN 16 or transaction processing system 10 through Internet 18 or any other network or communication system.

A database 30 is coupled to LAN 16 and is used by transaction processing system 10, agents 20 and 32, and server 12 to store and retrieve various types of information. For example, database 30 may contain information about the transaction processing system, the performance of the system, and the agents and customers that use transaction processing system 10. Since database 30 is coupled to LAN 16, all agent computers, servers, and other devices coupled to LAN 16 are capable of storing and retrieving information from the database.

As shown in FIG. 1, Internet 18 is coupled to server 12 and customer computers 22 and 24. Customer computer 22 may include an Internet phone for establishing verbal communications between the customer and an agent across Internet 18. The customer using computer 24 has a telephone 28 and a fax machine 26 coupled to PSTN 14 and located near computer 24. Thus, the user of computer 24 may communicate with an agent of the transaction processing system using Internet 18 (e.g., using an Internet phone or e-mail application), fax machine 26, telephone 28, or any combination thereof. For example, customer 24 may generate and transmit an e-mail message across Internet 18 to server 12. Server 12 then communicates the e-mail to transaction processing system 10, which provides the e-mail to a particular agent or group of agents for response. Agents may be grouped together based on area of expertise, company department, or type of support provided (e.g., sales or technical support). The agent responding to the e-mail can respond with another e-mail message or may respond by telephone, facsimile, or any other type of transaction supported by the transaction processing system and the transaction initiator. In particular embodiments of the invention, the transaction initiator may specify the type of transaction used by the responding agent. For example, a transaction initiator may generate an e-mail transaction, but request that an agent respond with a telephone call. Although customer computers 22 and 24 are shown coupled directly to Internet 18, it will be appreciated that any communication mechanism can be used to couple computers 22 and 24 to Internet 18, such as PSTN 14 and an Internet Service Provider (ISP). In alternate embodiments, Internet 18 may be replaced with any communication network using any communication protocol.

The environment illustrated in FIG. 1 includes a separate LAN 16 and Internet 18. In alternate environments, LAN 16 and Internet 18 are merged into a single communication network capable of communicating information between any two or more devices coupled to the communication network.

Figure 2:
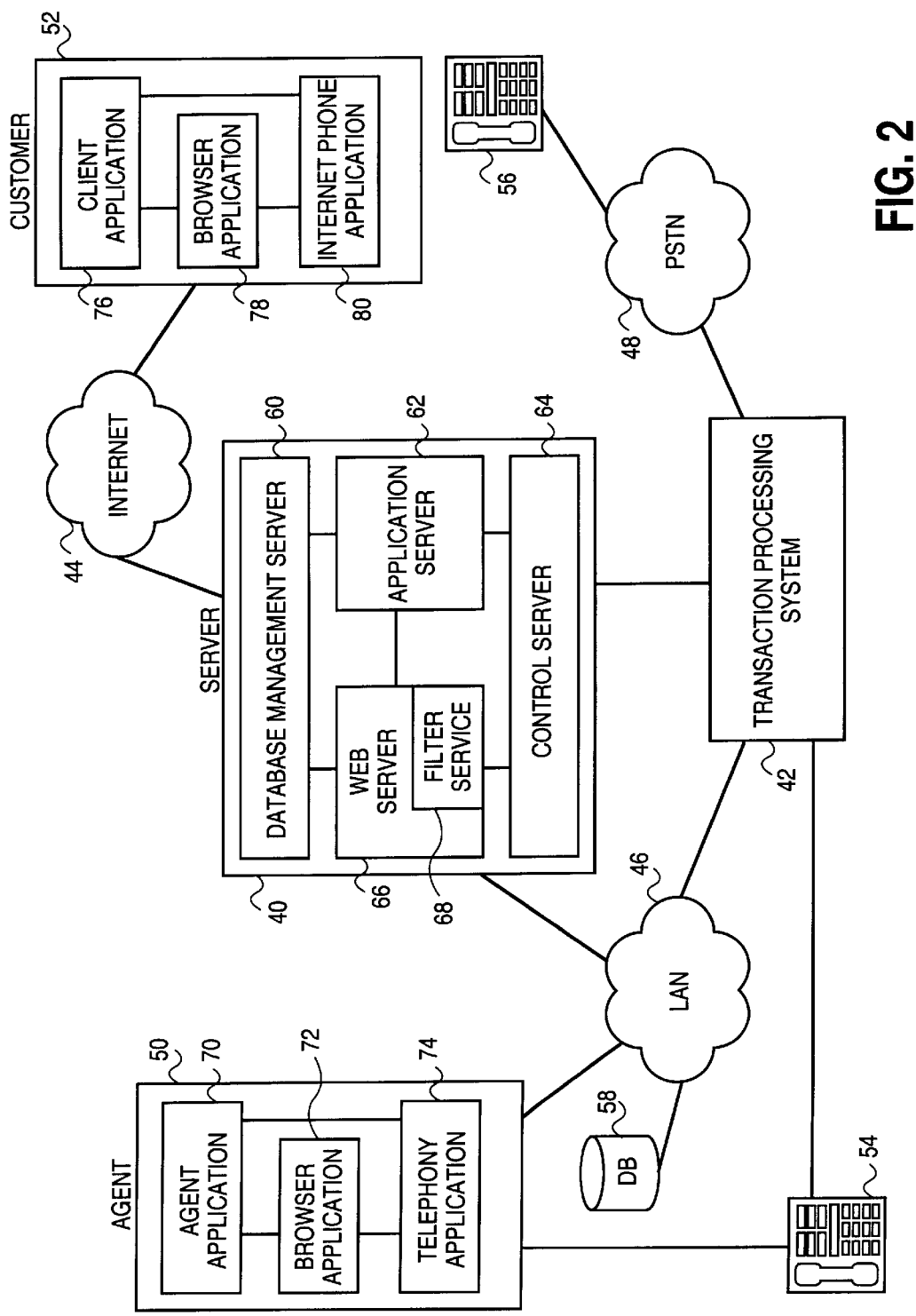
FIG. 2 illustrates an embodiment of a transaction processing environment including a server, an agent computer system, a customer computer system, and a transaction processing system coupled together using various networks.

FIG. 2 illustrates an embodiment of a transaction processing environment including a server 40, an agent computer system 50, a customer computer system 52, and a transaction processing system 42 coupled together using various networks. FIG. 2 illustrates a single agent computer system 50 and a single customer computer system 52. However, a typical transaction processing environment includes multiple agent computer systems and multiple customer computer systems. Server 40 is coupled to Internet 44, a LAN 46, and transaction processing system 42. Server 40 includes a database management server 60, an application server 62, a control server 64, and a web server 66. Additional details regarding server 40 are discussed below. In alternate embodiments, server 40, computer systems 50 and 52, and transaction processing system 42 are coupled together using different network configurations and network connections. Transaction processing system 42 is capable of processing various types of transactions, such as telephone calls, e-mail, voice mail, and facsimiles. In a particular embodiment of the invention, transaction processing system 42 is an automatic call distributor (ACD).

Agent computer system 50 includes an agent application 70, a browser application 72, and a telephony application 74. Agent application 70 interacts with other devices shown in FIG. 2 (e.g., server 40 and transaction processing system 42). For example, agent application 70 may retrieve information about a transaction initiator (such as account information and the types of products or services purchased) and display that information to the agent. In this example, agent application 70 is a client of database management server 60, which retrieves the appropriate information about the transaction initiator from a database 58. If the agent is a technical support agent, the information about the transaction initiator may include the types of products owned by the transaction initiator, previous problems encountered by the transaction initiator, and known problems with the products. Additionally, agent application 70 can display information regarding agent performance, the overall performance of the transaction processing system, and the current status of the agent (e.g., active or inactive).

Browser application 72 is any browser capable of communicating information across a communication link and displaying received information to the agent. In a particular embodiment, browser application 72 is capable of retrieving information from Internet 44 (e.g., in the form of Hypertext Markup Language (HTML) pages). Exemplary browser applications include Netscape Communicator™ sold by Netscape Communications Corporation of Mountain View, Calif., and Internet Explorer™ sold by Microsoft Corporation of Redmond, Wash. Embodiments of the invention exchange information between agent application 70 and browser application 72. In other embodiments of the invention, agent application 70 and browser application 72 are integrated into a single application.

Telephony application 74 controls a telephone 54 coupled to agent computer system 50 and transaction processing system 42. In other embodiments of the invention, a telephone adapter replaces telephone 54 and permits agent computer system 50 to perform the functions of a conventional telephone. For example, a WinSet™ adapter sold by Aspect Telecommunications of San Jose, Calif., may be used instead of telephone 54. Another embodiment of the invention uses a software-based telephone in place of telephone 54. In this embodiment, the software-based telephone is integrated into telephony application 74 and communicates with transaction processing system 42 through server 40 or LAN 46.

Customer computer system 52 includes a client application 76, a browser application 78, and an Internet phone application 80. Client application 76 may be any type of application capable of being executed by customer computer system 52. For example, client application 76 can be a word processor from which text is copied to browser application 78. Although FIG. 2 illustrates client application 76 and browser application 78 coupled to one another, in alternate embodiments of the invention there is no direct coupling of client application 76 and browser application 78.

Browser application 78 is any browser capable of communicating information across a communication link and displaying received information to the customer. Browser application 78 is not necessarily the same type of browser application used in agent computer system 50. In a particular embodiment, browser application 72 is capable of retrieving information from Internet 44 (e.g., in the form of Hypertext Markup Language (HTML) pages). Exemplary browser applications include Netscape Communicator™ and Internet Explorer™, identified above. Embodiments of the present invention can be implemented without any interaction between browser application 78 and other applications executed by customer computer system 52.

Internet phone application 80 allows the user of computer system 52 to establish a voice communication link across Internet 44 instead of using a telephone 56 and a PSTN 48. In particular embodiments of the invention, customer computer system 52 does not contain an Internet phone application. In these embodiments, the user of computer system 52 uses telephone 56 and PSTN 48 to establish a voice communication link with another individual or system. Alternatively, the user of computer system 52 may use a text chat window, discussed below with respect to FIG. 6, to communicate with another individual or system.

Database management server 60 (contained in server 40) manages information contained in database 58. The information stored in database 58 includes customer information, product or service information, transaction tracking information, and other data that may be used by transaction processing system 42, agents, customers, or server 40. Application server 62 communicates with database management server 60 and provides information to agent application 70. For example, application server 62 can retrieve information about a customer from database 58 using database management server 60. The retrieved information is then provided to agent application 70 across LAN 46 for display on agent computer system 50.

Control server 64 performs multiple control and management functions, as discussed in greater detail below with respect to FIG. 3. Control server 64 establishes and maintains communication links between multiple pairs of agents and customers. Control server 64 communicates with transaction processing system 42 to locate one or more available agents, establishes data and/or voice connections between agents and customers, and controls the flow of data between agents and customers.

Web server 66 communicates data, in the form of web pages, to browser applications 72 and 78. Additionally, web server 66 stores web pages and other web-based information used by the devices in the transaction processing environment. Web server 66 includes a filter service 68 that filters and modifies various web pages. Filter service 68 changes the web page content (e.g., by adding JavaScript methods) to allow the coordination and exchange of information between browser applications 72 and 78. For example, if a customer using browser application 78 changes information on a web page by entering information on a form, the information entered by the customer may be communicated to the agent's browser application 72. Similarly, if an agent selects a different web page using browser application 72, the selected web page may be delivered to browser application 78 for viewing by the customer. Thus, the changes made to the web page by filter service 68 allow other services, discussed below, to coordinate web pages and web page information between browser applications 72 and 78 such that the agent and the customer view the same web page with the same information. Additional details regarding the various services that coordinate and exchange information between the browser applications are provided below with respect to FIGS. 3 and 4.

Figure 3:
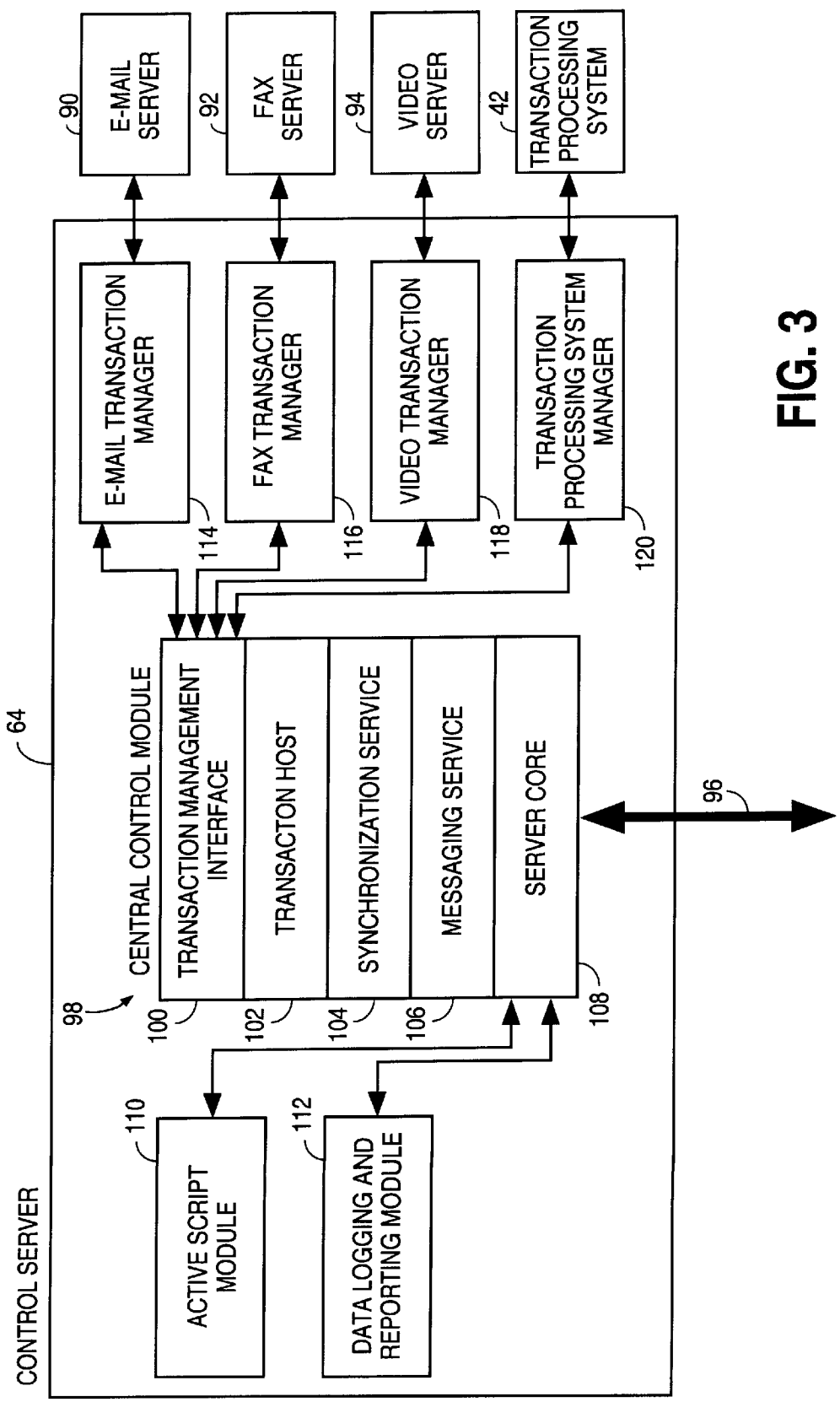
FIG. 3 illustrates an embodiment of a control server.

FIG. 3 illustrates an embodiment of control server 64, shown as part of server 40 in FIG. 2. Control server 64 is shown coupled to an e-mail server 90, a fax server 92, a video server 94, and transaction processing system 42. E-mail server 90 handles both incoming e-mail (e.g., from a customer) and outgoing e-mail (e.g., from an agent). Fax server 92 handles both incoming and outgoing facsimiles. Video server 94 handles video information and video sessions, for use by an agent, customer, or other device or user in the transaction processing environment. Additionally, video server 94 handles other multimedia information and multimedia sessions (e.g., sessions that exchange both audio and video data). Transaction processing system 42 handles various transactions, as discussed above. E-mail server 90, fax server 92, and video server 94 may be coupled directly to control server 64 (and server 40 shown in FIG. 2) or coupled to control server 64 through a network (e.g., LAN 46) or other communication medium. In alternate embodiments of the invention, any one or more of servers 90 -94 can be contained within server 40 (FIG. 2) and coupled directly to control server 64.

Control server 64 communicates with e-mail server 90, fax server 92, and video server 94 using any type of communication medium, such as LAN 46. In this embodiment of the invention, control server 64 communicates with transaction processing system 42 using a dedicated communication line, as shown in FIG. 2. In alternate embodiments of the invention, control server 64 communicates with transaction processing system 42 across a network, such as LAN 46 (FIG. 2). Control server 64 also communicates with other systems, such as browser applications and web servers, using a communication link 96. In an embodiment of the invention, communication link 96 is a network communication link (e.g., a communication link in LAN 46). Alternatively, communication link 96 may be a dedicated communication link to one or more devices in the transaction processing environment. Communication link 96 is used to communicate various commands and other information between control server 64 and other devices.

As shown in FIG. 3, control server 64 includes an active script module 110 that handles the display of scripts and other information to an agent using the agent's browser application 72. An embodiment of active script module 110 generates scripts in the form of web pages that can be displayed on the agent's browser application. Additional details regarding agent scripts and other information displayed using an agent's browser application are provided below with respect to FIG. 6.

A data logging and reporting module 112 controls the storage (or logging) of transaction information in database 58 using database management server 60. Additionally, module 112 is capable of generating various types of reports summarizing or identifying performance characteristics and other information related to the transaction processing environment. For example, module 112 may generate reports detailing the overall transaction handling performance, such as the number of transactions handled per hour, the average response time for each type of transaction, and the number of transaction responses that exceeded a quality of service limit for the transaction.

A central control module 98 includes a transaction management interface 100, a transaction host 102, a synchronization service 104, a messaging service 106, and a server core 108. Server core 108 receives new requests (e.g., on communication link 96) from other devices in the transaction processing environment and provides the request to one or more other modules for processing. For example, server core 108 may continuously monitor communication link 96 for request signals that can be handled by server core 108. If the request signal is a request to generate a performance report, server core 108 forwards the request to data logging and reporting module 112 for processing. Module 112 then generates the requested report and provides the report to server core 108, which communicates the report to the appropriate device via communication link 96. Similarly, if the request signal is a request for an agent script, server core 108 forwards the request to active script module 110, which selects or generates an appropriate agent script. Module 110 provides the agent script to server core 108, which then communicates the agent script to the appropriate device (e.g., the requesting device).

Requests that cannot be handled by active script module 110 or data logging and reporting module 112 are communicated to another portion of central control module 98 for processing. Messaging service 106 establishes and manages message types used to communicate information between two or more individuals or devices in a transaction processing environment (e.g., message types used to communicate information between an agent and a customer). After a communication link has been established between, for example, an agent and a customer, messaging service 106 maintains the network or communication addresses for both the agent and customer. Typically, messaging service 106 establishes and manages multiple communication links for multiple customer-agent communications.

Synchronization service 104 synchronizes changes between all participants in a particular communication. For example, in an agentcustomer communication, any changes entered to a web page by the customer are identified by synchronization service 104, and provided to the agent's browser application. Thus, synchronization service 104 ensures that all participants in a communication are provided with the same information.

Transaction host 102 manages various portions of the interaction between, for example, an agent and a customer. Transaction host 102 maintains the status of multiple interactions and maintains the identity (such as the network or communication address) of each participant involved in each interaction. If a request is received to provide information to a participant, then transaction host 102 determines the address associated with the participant and provides the address to the appropriate module responsible for providing the requested information.

Transaction management interface 100 is coupled to an e-mail transaction manager 114, a fax transaction manager 116, a video transaction manager 118, and a transaction processing system manager 120. Transaction management interface 100 manages the interaction and exchange of information between central control module 98 and the various transaction managers 114–120. Each transaction manager 114–120 handles a particular type of transaction, and communicates with the server responsible for that transaction type. In alternate embodiments of the invention, two or more of transaction managers 114–120 are combined into a single transaction manager. When server core 108 receives a request that requires interaction with a server or device external to control server 64, then transaction management interface 100 contacts the appropriate transaction manager for processing the request. For example, if server core 108 receives a request to select an agent to handle a transaction, then transaction management interface 100 contacts transaction processing system manager 120 to request an agent from transaction processing system 42.

Transaction management interface 100 may receive requests (or calls for service) from server core 108 or transaction host 102. Additionally, transaction management interface 100 may receive requests from any transaction manager 114–120. For example, e-mail transaction manager 114 may notify transaction management interface 100 that e-mail server 90 has received an e-mail that requires processing. Transaction management interface 100 then communicates the information regarding the received email to other services or managers to determine how the e-mail should be handled. For example, transaction processing system manager 120 may be contacted to identify an agent to handle the e-mail. The manner in which the e-mail is to be handled is then communicated to e-mail transaction manager 114, which then instructs e-mail server 90 regarding the processing of the e-mail.

Figure 4:
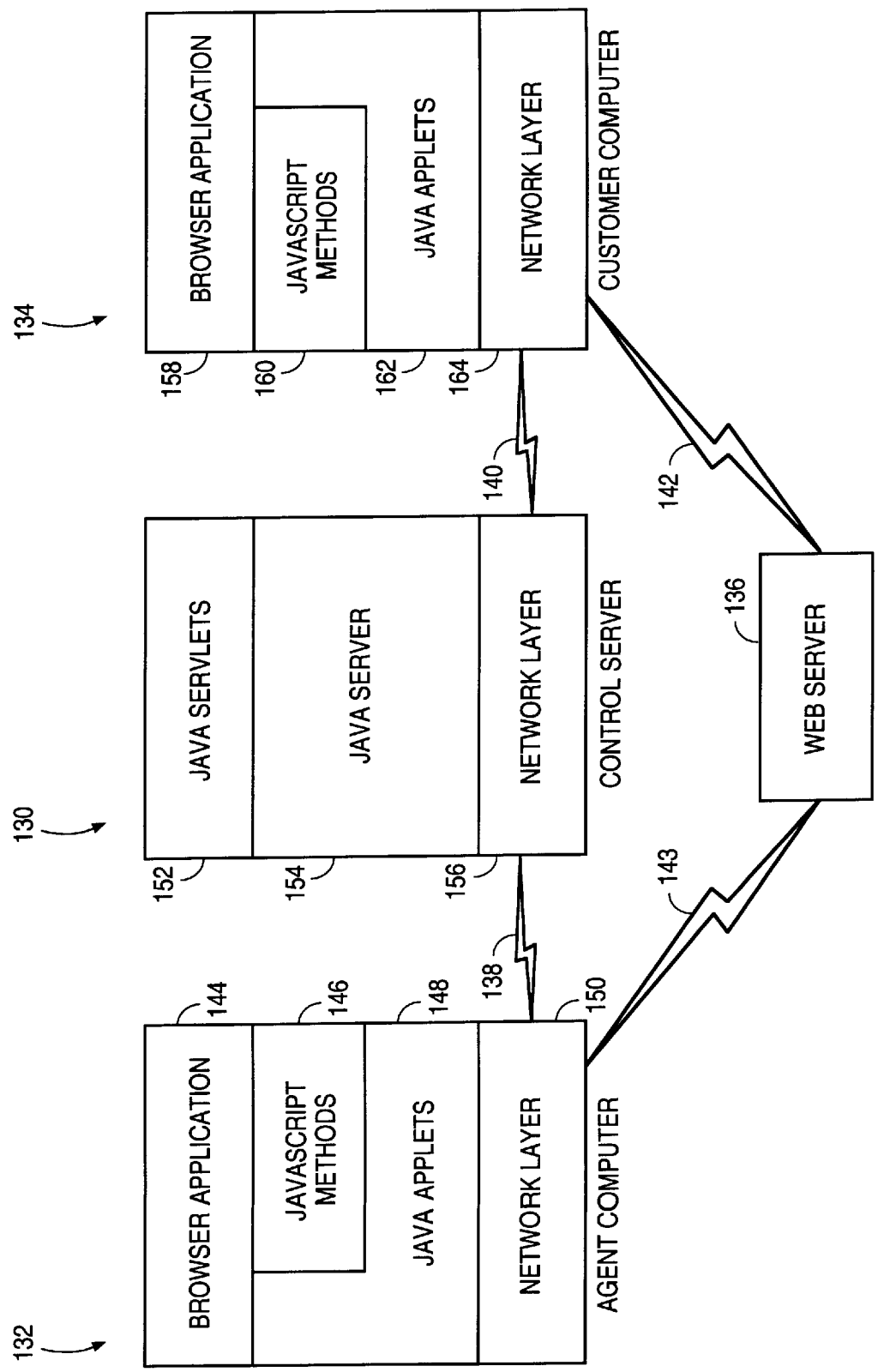
FIG. 4 illustrates an embodiment of a system architecture for communicating information between various devices in a transaction processing environment.

FIG. 4 illustrates an embodiment of a system architecture for communicating information between various devices in a transaction processing environment. The system architecture of FIG. 4 includes a control server 130, an agent computer 132, and a customer computer 134. Agent computer 132 is coupled to control server 130 via communication link 138 (e.g., LAN 46 in FIG. 2) and coupled to a web server 136 via communication link 143 (e.g., Internet 44). Customer computer 134 is coupled to control server 130 using communication link 140 (e.g., Internet 44 in FIG. 2). Customer computer 134 is also coupled to web server 136 via communication link 142 (e.g., Internet 44). Web server 136 stores and distributes various web pages requested by a browser application. Although web server 136 and control server 130 are shown as two separate servers in FIG. 4, they may be hosted by the same hardware or the same server system.

Agent computer 132 contains a browser application 144 of the type discussed above with respect to FIG. 2. The embodiment of the system architecture shown in FIG. 4 is implemented using the Java™ programming language Java is a trademark of Sun Microsystems Inc. of Mountain View, Calif.). Alternate embodiments of the invention may be implemented using other programming languages, including object-oriented programming languages. Agent computer 132 contains one or more JavaScript methods 146 and one or more Java applets 148. A JavaScript method is a sequence of instructions that perform various operations and have the ability to invoke Java methods. A Java applet is a program, written in Java, that may be stored within a web page. When the web page is retrieved by a browser application, the Java applet is executed by the browser and performs the programmed operations. The activity or operation performed by the agent (or the agent's browser application 144) determines whether a JavaScript method or a Java applet is activated. For example, if the agent clicks an icon associated with a Java applet, then the Java applet is activated. However, if the agent performs an operation that is associated with a JavaScript method, then the JavaScript method is performed in response to the operation.

Agent computer 132 includes a network layer 150, which is a logical layer at which agent computer 132 communicates with other devices via communication link 138. Control server 130 has a network layer 156, which communicates with control layer 150 to exchange information between control server 130 and agent computer 132. A Java server 154 communicates with network layer 156 to exchange information with other devices (e.g., agent computer 132 and customer computer 134). Java server 154 corresponds to server core 108 (FIG. 3) and controls the overall operation of control server 130. Java server 154 is implemented using the Java programming language. Java server 154 communicates with one or more Java servlets 152, which perform various operations necessary to process transactions and communicate information between devices. In a particular embodiment, Java servlets 152 may correspond to various modules shown in FIG. 3, such as transaction management interface 100, transaction host 102, synchronization service 104, messaging service 106, active script module 110, and data logging and reporting module 112.

A network layer 164 in customer computer 134 communicates with network layer 156 and with web server 136. Although not shown in FIG. 4, web server 136 may also include a network layer for communicating data across communication link 142. Customer computer 134 contains one or more Java applets 162 and one or more JavaScript methods 160. Additional details regarding the operation of Java applets 162 and JavaScript methods 160 are provided below. Customer computer 134 also includes a browser application 158 of the type discussed above with respect to FIG. 2.

In a particular embodiment of the invention, an agent is able to "push" a web page or other information to a customer using the system shown in FIG. 4. For example, the agent may identify a particular web page and communicate the uniform resource locator (URL) associated with the web page to customer computer 134 via control server 130. The customer's browser application 158 receives the URL and retrieves the associated web page from web server 136. Thus, the agent "pushes" the web page to the customer by providing the URL associated with the web page to the customer's browser application.

Figure 5:
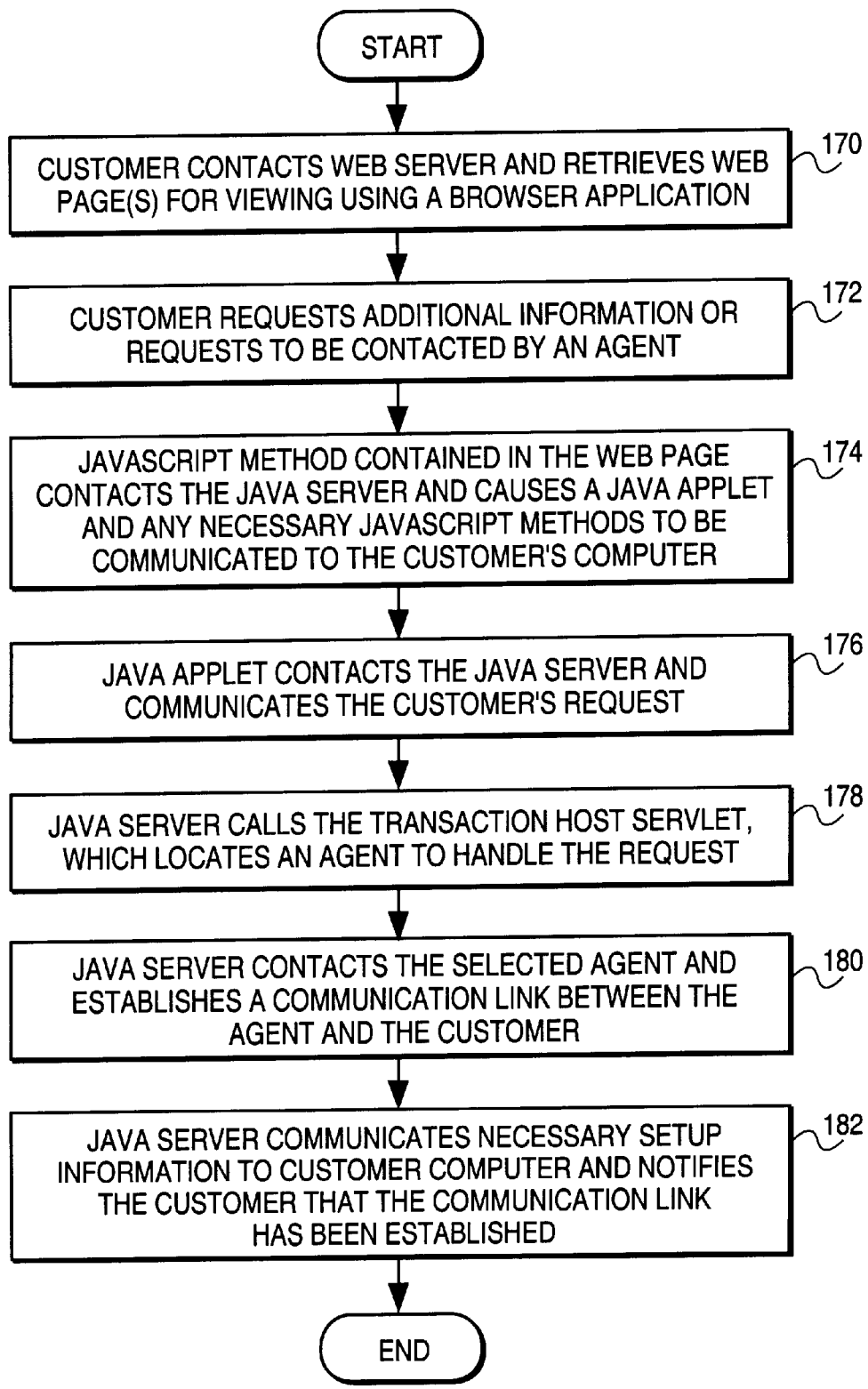
FIG. 5 is a flow diagram illustrating an embodiment of a procedure for communicating information between various devices using the architecture of FIG. 4.

FIG. 5 is a flow diagram illustrating an embodiment of a procedure for communicating information between various devices using the architecture of FIG. 4. At step 170, a customer contacts a web server (e.g., web server 136) and retrieves one or more web pages for viewing using a browser application (e.g., browser application 158). At step 172, the customer requests additional information about a product or service, or requests to be contacted by an agent. The customer may specify the manner in which the information or agent contact is handled (e.g., by return telephone call, by e-mail, or by facsimile). If the customer requests to be contacted using a conventional telephone or by facsimile, then the customer is asked to provide a telephone number for initiating the telephone call or facsimile. At step 174, a JavaScript method, contained in the web page accessed by the customer, is executed by the customer's browser application. When executed, the JavaScript method causes the customer's computer to contact the Java server (e.g., Java server 154) and requests a Java applet and any necessary JavaScript methods. The requested Java applet and JavaScript methods are then communicated from the Java server to the customer's computer. The particular Java applet and JavaScript methods communicated to the customer's computer may vary depending on the web page that was being viewed by the customer when the request for additional information or agent contact was entered. The particular web page being viewed may contain JavaScript methods that identify the necessary Java applet and JavaScript methods to be communicated to the customer's computer.

At step 176, the Java applet (running on the customer's computer) contacts the Java server and communicates the customer's request to the Java server. In this example, the customer has requested that an agent contact the customer by return telephone call. Step 178 calls the transaction host servlet (e.g., the servlet that performs the functions of transaction host 102 in FIG. 3), which locates an agent to handle the customer's request. An agent may be located by communicating with transaction processing system manager 120 to select an agent and to initiate a telephone call across the PSTN.

After an agent has been selected to handle the customer's request, step 180 contacts the selected agent and informs the agent regarding the customer's request. At this time, information about the customer may be displayed to the selected agent (e.g., account information, or past purchases). Step 180 also establishes a communication link (in this example, a telephone link) between the selected agent and the customer. A transaction processing system may be used to automatically establish the telephone link across a PSTN or a web server may be used to establish an Internet telephone call across the Internet. In particular embodiments of the invention, both a voice communication link and a data communication link are established between the agent and the customer. The data communication link can be established and maintained by the control server. Both the agent computer and the customer computer may communicate with the control server, which coordinates the flow of messages and other information between the agent and the customer. For example, the control server forwards messages received from the agent computer system to the customer computer system, and vice versa.

At step 182, the Java server communicates any necessary setup information to the customer's computer and notifies the customer that the communication link has been established. This notification can be performed, for example, by communicating through the network layers to the customer's browser application. In this example, the customer requested a return telephone call. Although a return telephone call has been initiated, the customer and the agent may continue to communicate using their browser applications. For example, the agent may "push" web pages or other information to the customer for viewing using the customer's browser application.

FIG. 6 illustrates an embodiment of various windows (also referred to as frames) displayed to an agent using the agent's computer. An agent's computer includes a display device that provides visual information to the agent. In FIG. 6, an agent's browser application generates a display 190 containing multiple frames 192, 194, 196, 198, and 200. Frame 192 represents the web page or other information currently being displayed to the customer. Thus, the agent is able to easily determine what information is available to the customer based on frame 192. Additionally, the agent can provide additional information about a product or service while referring to the information already displayed to the customer. Frame 194 is a text chat window that allows the agent and the customer to communicate using typed information. The text chat window can be used at any time, and is particularly useful when a voice connection cannot be established between the agent and the customer (e.g., the customer does not have an Internet phone and has only one telephone line, which is used to access the Internet).

Frame 196 of display 190 contains various system information such as information about the agent and information relating to the overall system performance. Frame 196 may also be used to display messages to an agent from a supervisor or system administrator (e.g., asking the agent if they are available to work overtime, or notifying the agent of their next scheduled break). Frame 198 displays agent script information, such as a prepared script to be read to a customer. The script displayed in frame 198 may be modified to correspond to the product or service being discussed, or the script may be modified to include information about the customer (e.g., the customer's name). Frame 200 provides various links to information that may be provided by the agent to the customer. In a particular embodiment of the invention, the links shown in frame 200 are associated with web pages that contain information of interest to particular customers. For example, the link "FAQ—Acme XL-3000" may identify a web page that contains answers to frequently asked questions about the Acme XL-3000 computer system. If the agent wants to display these answers to the customer, the agent can select the link, which causes the web page to be transmitted to the customer's browser application. The same web page is then displayed in frame 192, to maintain correspondence between frame 192 and the web page displayed to the customer.

A visual indicator 202 is located near the middle of display 190, and indicates the status of a transmission to the agent. The appearance of visual indicator 202 may change based on the transmission status (e.g., indicating a complete transaction, an incomplete transaction, or a congested communication link). Various types of visual indicators 202 may be used to indicate transmission status and can be located anywhere on display 190. Other types of visual indicators are discussed below with respect to FIGS. 9A–9C. The visual indicator notifies the agent if a particular transmission (e.g., the transmission of a web page to a customer) has been completed or whether the communication link between the agent and the customer is congested. As the initiator of the transaction, the agent is not able to determine the status of the transmission because the agent cannot see the customer's computer display showing the web page or other information being transmitted. Although the same information is also displayed in frame 192, the speed at which the information is displayed in frame 192 is not generally the speed at which the information is transmitted to the customer.

Although particular examples are provided as used in a transaction processing environment, visual indicator 202 can be used in any communication environment, and is not limited to a transaction processing environment. Furthermore, visual indicator 202 may be used with any transmission source and any transmission destination to communicate the transmission status to the transmission source (or initiator of the transmission). In the embodiments discussed, visual indicator 202 is displayed proximate the transmission source. The transmission source may be the actual system that initiates and controls the transmission of information to a transmission destination. Alternatively, the transmission source may be the system that causes another device (located local or remote to the transmission source) to transmit information to a transmission destination. Thus, any device involved in the transmission of information to a transmission destination can be a transmission source. Additionally, visual indicator 202 can be displayed proximate the transmission source, but not on the transmission source itself. For example, visual indicator 202 may be displayed on a supervisor's computer system although the supervisor is not the transmission source.

Particular embodiments of the invention display visual indicator 202 to the initiator of the transmission (e.g., the agent initiating the transmission of a web page or other information to a customer). The transmission initiator may be located proximate the transmission source or may be located distant from the transmission source (e.g., using a remote computer system to access the transmission source). Embodiments of the invention display visual indicator 202 on two or more computer systems or other devices.

Figure 7:
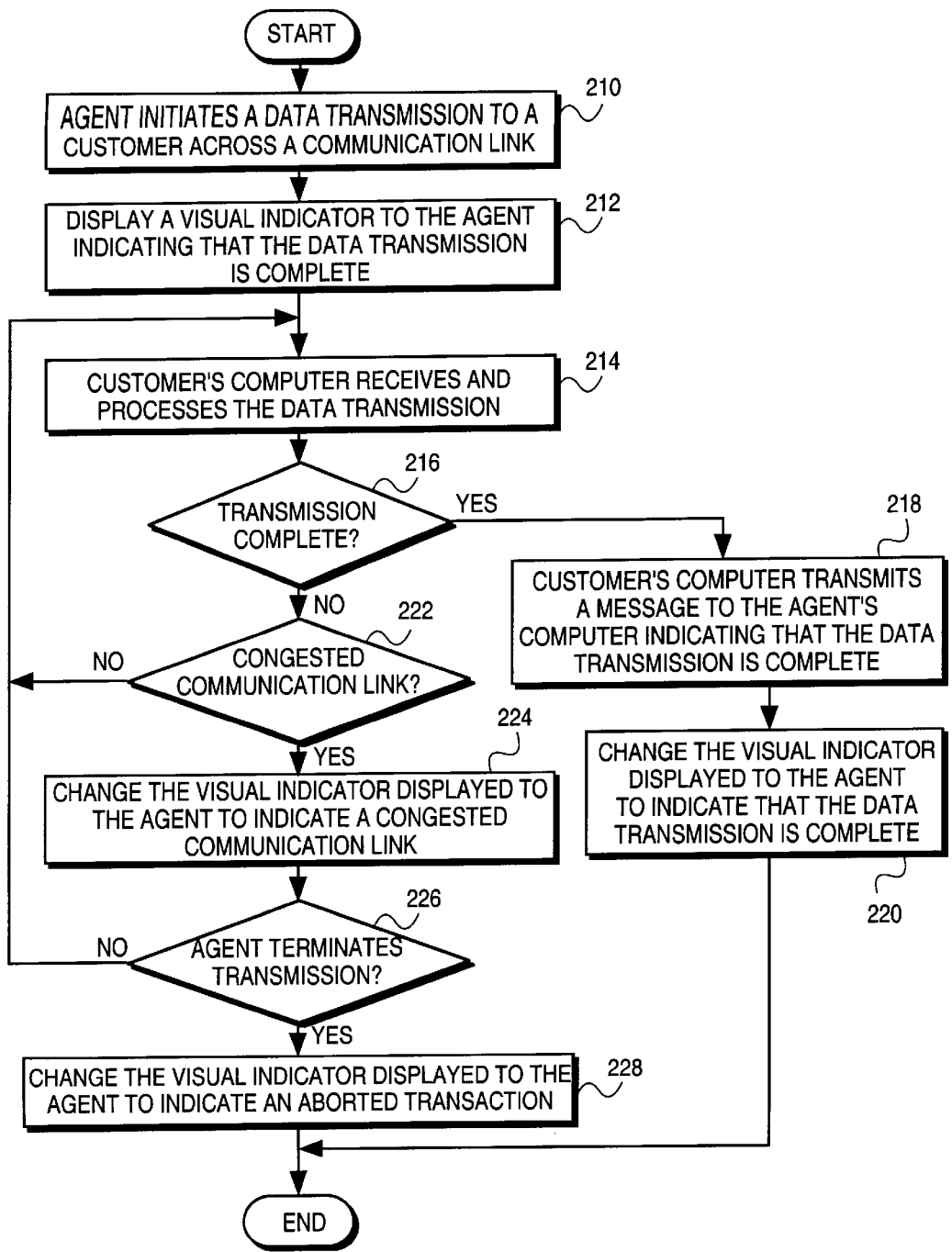
FIG. 7 is a flow diagram illustrating an embodiment of a procedure for displaying visual indicators representing transmission status.

FIG. 7 is a flow diagram illustrating an embodiment of a procedure for displaying visual indicators representing transmission status. The procedure described with respect to FIG. 7 refers to an agent initiating a data transmission to a customer. However, the procedure illustrated in FIG. 7 may be applied to any transmission between a source and a destination across any type of communication link.

At step 210, an agent initiates a data transmission to a customer across a communication link (e.g., transmitting a web page to the customer). Step 212 displays a visual indicator to the agent indicating that the data transmission is incomplete. At step 214, the customer's computer begins to receive and process the data transmission. In the example of a web page, the customer's computer may begin to display the web page as it is received. Step 216 determines whether the transmission from the agent to the customer is complete. A procedure (e.g., a JavaScript method) executed by the customer's computer can be used to determine when the transmission is completed. If the transmission is complete, the procedure branches to step 218, where the customer's computer transmits a message to the agent's computer indicating that the data transmission is complete. At step 220, the visual indicator displayed to the agent is changed to indicate that the data transmission is complete.

If the transmission is not complete at step 216, then the procedure continues to step 222, which determines whether the communication link is congested. Congested communication links can be identified by a small amount of received data for a particular period of time. The agent or the customer may specify particular thresholds for detecting a congested communication link (e.g., transmission rate below a transmission threshold rate for a particular time period). Alternatively, default thresholds may be provided for detecting communication link congestion. If step 222 does not identify congestion on the communication link, then the procedure returns to step 214 to continue receiving and processing data. If congestion is identified at step 222, then the procedure continues to step 224, which changes the visual indicator displayed to the agent to indicate a congested communication link. Step 226 then determines whether the agent has terminated the data transmission. Step 226 may include advising the agent to terminate the transmission. If the agent does not terminate the transmission, then the procedure returns to step 214. If the agent terminates the transmission, then step 228 changes the visual indicator displayed to the agent to indicate an aborted transaction.

Figure 8:
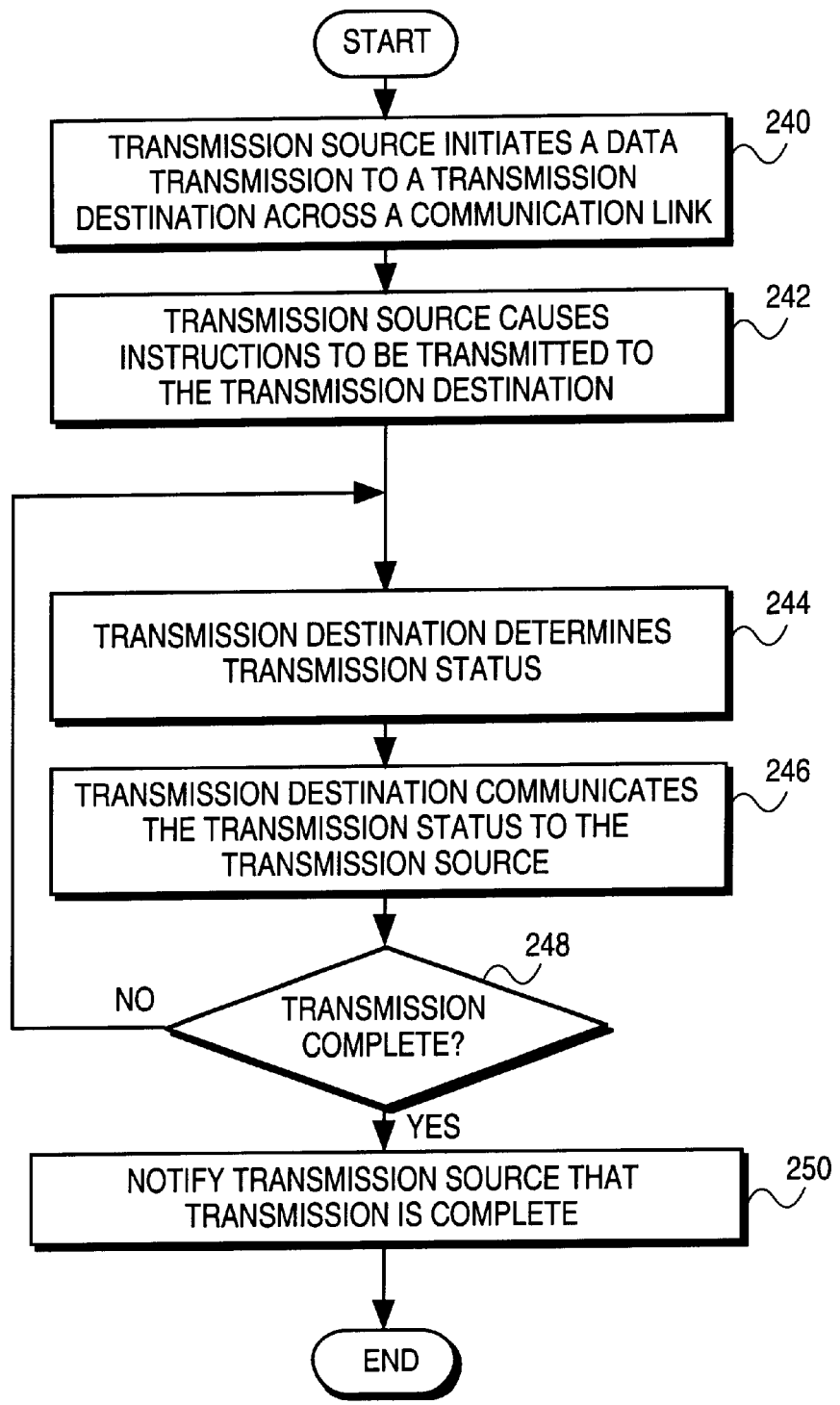
FIG. 8 is a flow diagram illustrating an embodiment of a procedure for determining the status of a transmission across a communication link.

FIG. 8 is a flow diagram illustrating an embodiment of a procedure for determining the status of a transmission across a communication link. At step 240, a transmission source initiates a data transmission to a transmission destination across a communication link. At step 242, the transmission source causes instructions to be transmitted to the transmission destination. The instructions allow the transmission destination to determine the transmission status and communicate that status back to the transmission source. If the transmission destination has already received the instructions (e.g., during a previous data transmission or as part of an initialization of the communication between the source and the destination), then step 242 can be disregarded. In one embodiment of the invention, the instructions are in the form of a JavaScript method or a Java applet to be executed by the transmission destination. In alternate embodiments, any type of instruction using any procedural language can be communicated to the transmission destination.

At step 244, the transmission destination determines the transmission status (e.g., using the instructions communicated to the transmission destination in step 242). If the transmission destination knows the total size of the transmission, then it can determine the portion of the transmission that has been completed. However, if the transmission destination does not know the total size of the transmission, then the destination determines whether the transmission is complete and whether the communication link is congested. The transmission destination may determine that the transmission is complete when, for example, an end-of-file or end-of-transmission indicator is received. Both the transmission source and the transmission destination may communicate with a control server, such as control server 130 discussed above. In this situation, the control server coordinates the flow of data and other information between the transmission source and the transmission destination. Thus, the control server receives information from both the source and the destination and forwards the received information to the other data transmission participant, as necessary. Additionally, the control server is able to coordinate the flow of data and other information between multiple transmission sources and multiple transmission destinations.

At step 246, the transmission destination communicates the transmission status to the transmission source. This transmission status is used by the transmission source to change, as necessary, the visual indicator displayed to the transmission initiator or displayed proximate the transmission source. In a particular embodiment of the invention, the transmission destination, in step 246, also communicates the amount of data received in the current data transmission. If the transmission source knows the total size of the data transmission, then the source uses the information regarding the amount of data received by the destination to determine the percentage of the transmission that has been completed.

At step 248, the procedure determines whether the data transmission is complete. If the transmission is not complete, the procedure returns to step 244 to determine (i.e., update) the transmission status. If the transmission status has not changed since the last determination, then step 246 may be disregarded. If step 248 determines that the transmission is complete, the procedure continues to step 250, where the transmission source is notified that the transmission is complete.

As discussed above, embodiments of the invention provide instructions from the transmission source to the transmission destination for communicating the transmission status back to the transmission source. Since these instructions are provided by the transmission source, the transmission destination does not require any additional hardware or software programs to implement the invention (as long as the transmission destination is able to execute the received instructions). In a particular embodiment of the invention, the instructions are written in the Java programming language. Thus, when the data transmission is a web page, any browser application that supports Java and JavaScript methods can execute the Java and JavaScript instructions. Thus, the invention may be used with a variety of transmission destinations without requiring the destination to have specialized hardware or software to execute the instructions.

Figure 9A:
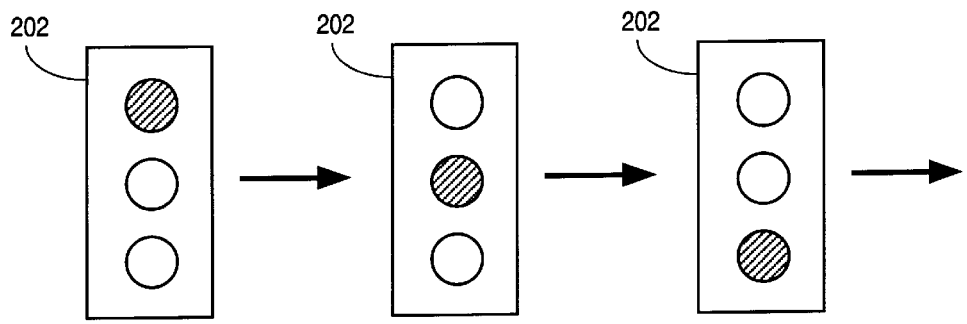
FIGS. 9A–9C illustrate examples of visual indicators that represent transmission status.
Figure 9B:
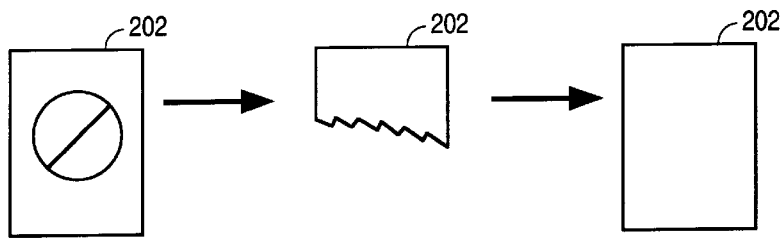
Figure 9C:
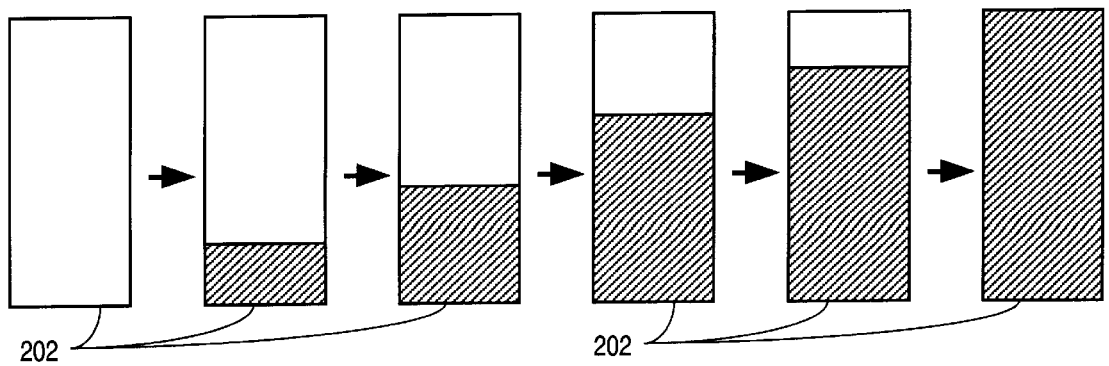

FIGS. 9A–9C illustrate examples of visual indicators that represent transmission status. FIG. 9A illustrates three different versions of visual indicator 202 (also shown in FIG. 6). In the first version of visual indicator 202, the top circle is highlighted (or filled), indicating that the data transmission has not yet started. In the second version of visual indicator 202, the middle circle is highlighted (or filled), indicating that the data transmission has started, but is incomplete. When the data transmission is completed, visual indicator 202 changes to the third version, in which the bottom circle is highlighted (or filled). The three circles in visual indicator 202, when highlighted, may be different colors. In a particular embodiment of the invention, when highlighted, the top circle is red, the middle circle is yellow, and the bottom circle is green (i.e., colors commonly used in a traffic light). Various changes can be made to visual indicator 202 to indicate a congested link, such as causing one or more of the circles to flash, highlighting two or more circles simultaneously, changing the color of the highlighted circle, or changing the color of the entire visual indicator.

Thus, the operator of the computer or device displaying visual indicator 202 is able to quickly determine the status of the transmission. For example, an agent may be waiting for a web page to be transmitted to a customer before discussing various details contained in the web page. Visual indicator 202 notifies the agent when the entire web page has been received by the customer and, therefore, displayed on the customer's computer. Additionally, visual indicator 202 alerts the agent to potential communication link congestion and allows the agent to terminate the transmission or attempt to retransmit the web page.

FIG. 9B illustrates another embodiment of a visual indicator 202 that represents the status of a data transmission. The first version of the visual indicator 202 represents the status when the transmission has not been started. The second version identifies that the transmission has started, but is not yet complete. When the transmission is complete, the third version of the visual indicator 202 is displayed. FIG. 9C illustrates a visual indicator 202 having six different versions, representing varying stages of data transmission status. FIGS. 9A–9C represent examples of visual indicators 202 that represent transmission status. However, the teachings of the present invention can be used with various other types of visual indicators 202 to represent transmission status.

Figure 10:
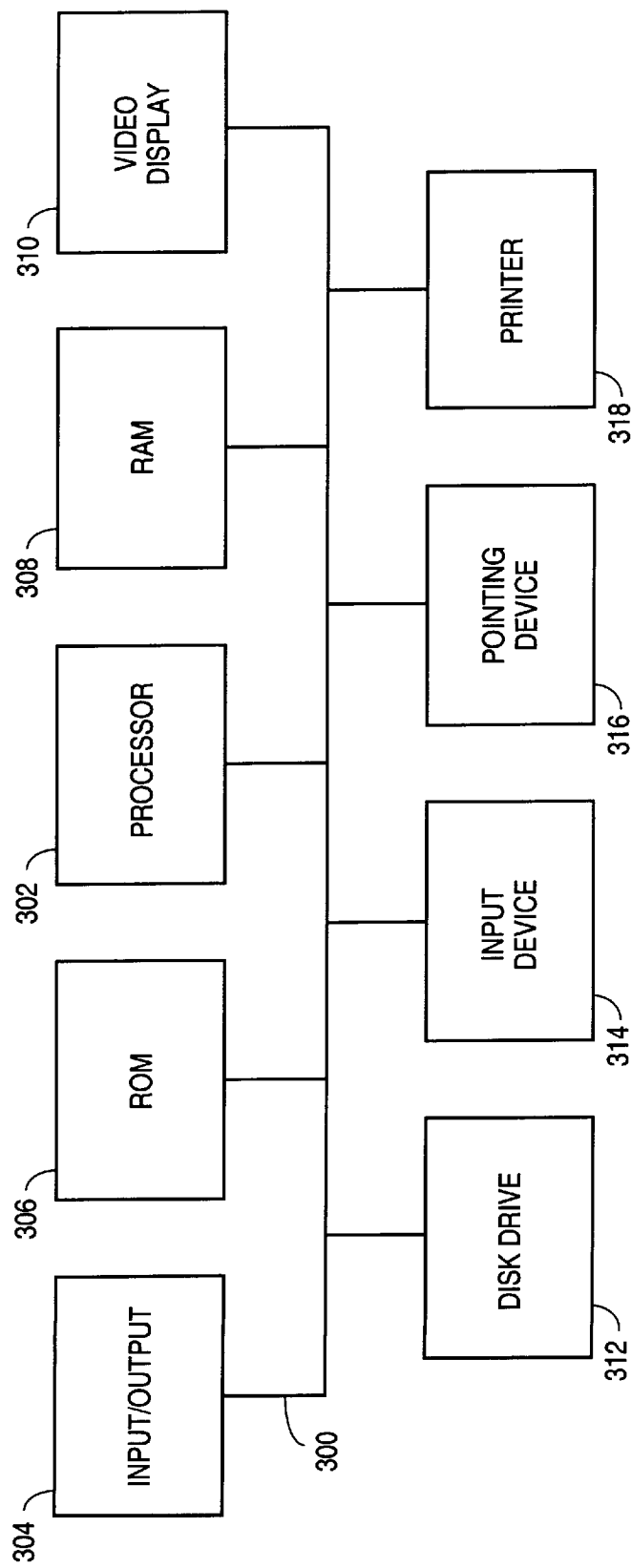
FIG. 10 illustrates an embodiment of a computer system that can be used with the present invention.

FIG. 10 illustrates an embodiment of a computer system that can be used with the present invention. For example, embodiments of the invention may use a computer of the type shown in FIG. 10 for an agent's computer, a customer's computer, a server, a transaction processing system, or any other device contained in or used with the transaction processing environment discussed above. The various components in FIG. 10 are provided by way of example. Certain components of the computer in FIG. 10 can be deleted for particular implementations of the invention. The computer system shown in FIG. 10 may be any type of computer, including a general purpose computer.

FIG. 10 illustrates a system bus 300 to which various components and devices are coupled. A processor 302 performs the processing tasks required by the computer. Processor 302 may be any type of processing device capable of implementing the steps necessary to perform the various procedures and operations discussed above. An Input/Output (I/O) device 304 is coupled to bus 300 and provides a mechanism for communicating with other devices coupled to the computer. A Read-Only Memory (ROM) 306 and a Random Access Memory (RAM) 308 are coupled to bus 300 and provide a storage mechanism for various data and information used by the computer. Although ROM 306 and RAM 308 are shown coupled to bus 300, in alternate embodiments, ROM 306 and RAM 308 are coupled directly to processor 302 or coupled to a dedicated memory bus (not shown).

A video display 310 is coupled to bus 300 and displays various information and data to the user of the computer. A disk drive 312 is coupled to bus 300 and provides a mechanism for the long-term mass storage of information. An input device 314 and a pointing device 316 are also coupled to bus 300 and allow the user of the computer to enter information and commands to the computer system. Input device 314 may be, for example, a keyboard, keypad, handwriting recognition device, or voice recognition device. Pointing device 316 includes, for example, a mouse, track ball, or touch pad. A printer 318 is coupled to bus 300 and is capable of creating a hard copy of information generated by or used by the computer.

Embodiments of the present invention may be implemented using a computer-readable medium (also referred to as a processor-readable medium) containing various sets of instructions, code sequences, configuration information, and other data used by a computer or other processing device. The various information stored on the computerreadable medium is used to perform various data communication, data processing, and data handling operations, such as those described above. The computer-readable medium may be any type of magnetic, optical, or electrical storage medium including a diskette, magnetic tape, CD-ROM, memory device, or other storage medium.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of indicating transmission status, the method including:
    transmitting a status instruction from a transmission source to a transmission destination across a communication link;
    determining a status of a transmission across the communication link based on status information received from the transmission destination, wherein the status information is provided to the transmission source by the transmission destination responsive to the status instruction;
    displaying a first visual indicator representing the transmission status if the transmission is incomplete; and
    displaying a second visual indicator representing the transmission status if the transmission is complete.

2. The method of claim 1 further including:
    returning to the determination of the status of the transmission if the transmission is incomplete.

3. The method of claim 1 further including:
    displaying a third visual indicator representing the transmission status if the communication link is congested.

4. The method of claim 3 wherein the third visual indicator is displayed proximate a transmission source.

5. The method of claim 3 wherein the third visual indicator is displayed to a transmission initiator.

6. The method of claim 1 wherein the first visual indicator is displayed proximate a transmission source.

7. The method of claim 1 wherein the second visual indicator is displayed proximate a transmission source.

8. The method of claim 1 wherein the first visual indicator is displayed to a transmission initiator.

9. The method of claim 1 wherein the second visual indicator is displayed to a transmission initiator.

10. A method of indicating transmission status, the method including:
    transmitting a status instruction from a transmission source to a transmission destination across a communication link;
    determining a status of a transmission across the communication link based on status information received from the transmission destination, wherein the status information is provided to the transmission source by the transmission destination responsive to the status instruction;
    displaying a first visual indicator representing the transmission status if the transmission is incomplete, wherein the first visual indicator is displayed proximate a transmission source; and
    displaying a second visual indicator representing the transmission status if the transmission is complete, wherein the second visual indicator is displayed proximate the transmission source.

11. The method of claim 10 further including:
    returning to the determination of the status of the transmission if the transmission is incomplete.

12. The method of claim 10 further including:
    displaying a third visual indicator representing the transmission status if the communication link is congested, wherein the third visual indicator is displayed proximate the transmission source.

13. The method of claim 10 wherein determining of the status of the transmission across the communication link includes receiving the status information from a transmission destination.

14. A method of indicating transmission status, the method including:
    transmitting a status instruction from a transmission source to a transmission destination across a communication link;
    determining a status of a transmission across the communication link based on status information received from the transmission destination, wherein the status information is provided to the transmission source by the transmission destination responsive to the status instruction;
    displaying a first visual indicator representing the transmission status if the transmission is incomplete, wherein the first visual indicator is displayed to a transmission initiator; and
    displaying a second visual indicator representing the transmission status if the transmission is complete, wherein the second visual indicator is displayed to the transmission initiator.

15. The method of claim 14 further including:
    returning to the determination of the status of the transmission if the transmission is incomplete.

16. The method of claim 14 further including:
    displaying a third visual indicator representing the transmission status if the communication link is congested, wherein the third visual indicator is displayed to the transmission initiator.

17. The method of claim 14 wherein the determining of the status of the transmission across the communication link includes receiving the transmission status from a transmission destination.

18. An apparatus for indicating transmission status, the apparatus comprising:
    a display device located proximate a transmission source; and
    a processing device coupled to the display device and a communication link, wherein the processing device is to transmit a status instruction to a transmission destination across a communication link, to determine a status of a transmission across the communication link based on status information, wherein the status information is provided to the processing device by transmission destination responsive to the status instruction, wherein the processing device is configured to display a first visual indicator using the display device if the transmission is incomplete, and wherein the processing device is configured to display a second visual indicator using the display device if the transmission is complete.

19. The apparatus of claim 18 wherein the processing device is further configured to display a third visual indicator using the display device if the communication link is congested.

20. The apparatus of claim 18 wherein the processing device is further configured to receive the status of the transmission across the communication link from a transmission destination.

21. An apparatus for indicating transmission status, the apparatus comprising:

means for displaying information, wherein the display means is located proximate a transmission source; and means for processing data, wherein the processing means is coupled to the display means and a communication link, wherein the processing means transmits a status instruction to a transmission destination across a communication link; determines a status of a transmission across the communication link, wherein the status information is provided to the processing means by the transmission destination responsive to the status instruction, wherein the processing means displays a first visual indicator using the display means if the transmission is incomplete, and wherein the processing means displays a second visual indicator using the display means if the transmission is complete.

22. The apparatus of claim 21 wherein the processing means displays a third visual indicator using the display means if the communication link is congested.

23. The apparatus of claim 21 wherein the processing means receives the status of the transmission across the communication link from a transmission destination.

24. A computer software product including a medium readable by a processor, the medium having stored thereon a sequence of instructions which, when executed by the processor, cause the processor to:

transmit a status instruction from a transmission source to a transmission destination across a communication link;

determine a status of a transmission across the communication link based on status information received from the transmission destination wherein the status information is provided to the transmission source by the transmission destination responsive to the status instruction;

display a first visual indicator representing the transmission status if the transmission is incomplete; and display a second visual indicator representing the transmission status if the transmission is complete.

25. The computer software product of claim 24 further including instructions which, when executed by the processor, cause the processor to display a third visual indicator representing the transmission status if the communication link is congested.

26. The computer software product of claim 24 wherein the first visual indicator is displayed proximate a transmission source.

27. The computer software product of claim 24 wherein the second visual indicator is displayed proximate a transmission source.

28. The computer software product of claim 24 wherein the first visual indicator is displayed to a transmission initiator.

29. The computer software product of claim 24 wherein the second visual indicator is displayed to a transmission initiator.

30. A computer software product including a medium readable by a processor, the medium having stored thereon a sequence of instructions which, when executed by the processor, cause the processor to:

transmit a status instruction from a transmission source to a transmission destination across a communication link;

determine a status of a transmission across the communication link based on status information received from the transmission destination, wherein the status information is provided to the transmission source by the transmission destination responsive to the status instruction;

display a first visual indicator representing the transmission status if the transmission is incomplete, wherein the first visual indicator is displayed proximate a transmission source; and display a second visual indicator representing the transmission status if the transmission is complete, wherein the second visual indicator is displayed proximate the transmission source.

* * * * *